(No Model.)
D. W. BOVEE.
FEED GRINDER.
No. 575,588. Patented Jan. 19, 1897.
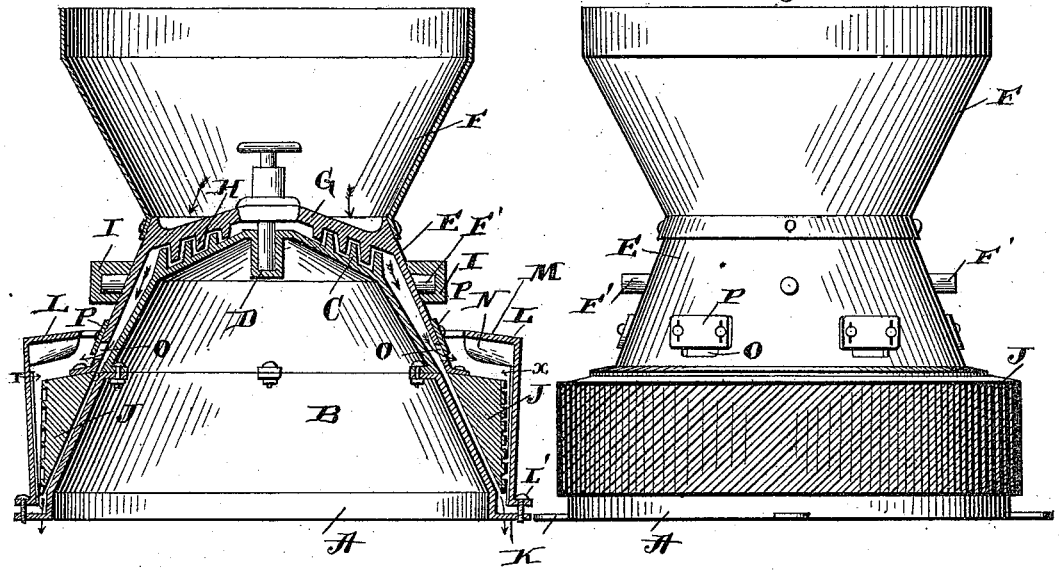
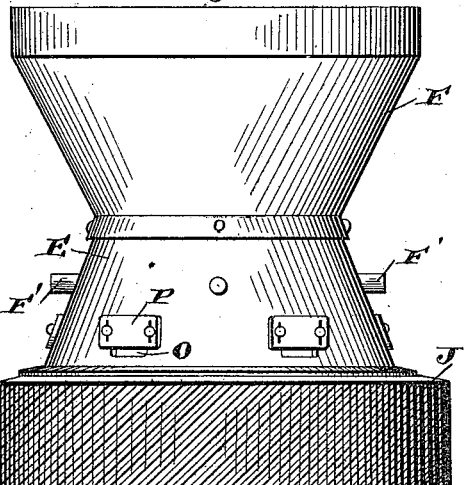
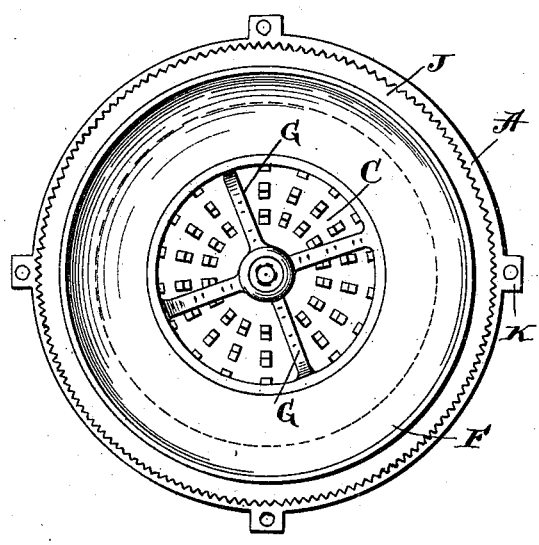
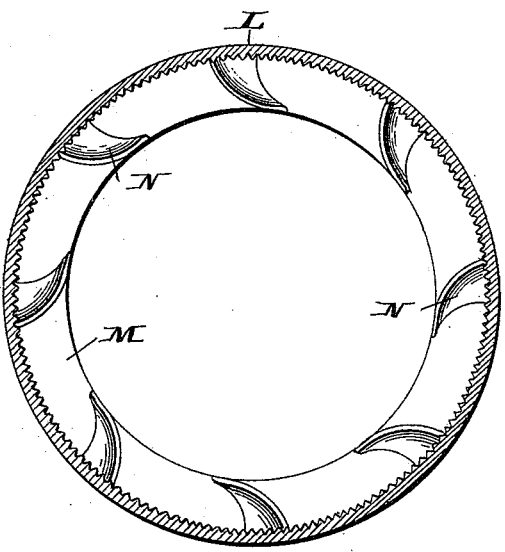
Witnesses
Geo. E. Fuch
James T. Evans
Inventor
D. W. Bovee
By Attorneys
Patterson & Haslit

UNITED STATES PATENT OFFICE.

DAVID W. BOVEE, OF WATERLOO, IOWA.

FEED-GRINDER.

SPECIFICATION forming part of Letters Patent No. 575,588, dated January 19, 1897.

Application filed March 3, 1896. Serial No. 581,623. (No model.)

*To all whom it may concern:*

Be it known that I, DAVID W. BOVEE, of Waterloo, in the county of Black Hawk and State of Iowa, have invented certain new and useful Improvements in Feed-Grinders; and I do hereby declare the following to be a full, clear, and exact description of the invention, such as will enable others skilled in the art to which it pertains to make and use it, reference being had to the accompanying drawings, which form part of this specification.

This invention pertains to grinding-mills; and the object of the same is to provide a mill of simple and improved construction for more effectually grinding corn and other grain.

The invention consists in the novel features of construction hereinafter fully described and claimed, and illustrated by the accompanying drawings, in which—

Figure 1 is a vertical sectional view of my improved mill. Fig. 2 is an elevation thereof with the outer stationary grinding-wall removed. Fig. 3 is a plan view. Fig. 4 is an inverted cross-sectional view of the outer grinding-wall.

A designates the base of the mill, which at its lower portion constitutes the inner stationary grinding-cone B, and which at its upper end is formed with crushing-teeth C and the central bearing D.

E designates the rotary shell, carrying hopper F and provided with cross-ribs G at the base of the hopper, from which depend teeth H, which coöperate with crushing-teeth C as the shell is rotated. Arms I of the sweep are secured on projections F' of the shell in the well-known manner.

To the lower end of shell E is secured the rotary grinder J, which is wedge-shaped in cross-section, with its inner surface disposed at about the same angle as the grinding-cone B, while its exterior surface is substantially vertical. The base is provided with projecting lugs K, and adjustable vertically thereon is the surrounding grinding-wall L, which, with relation to the outer surface of grinder J, has a slight upward divergence, and at the top of this stationary grinding surface or wall is the inwardly-extending flat surface M, provided upon its under side with the spirally-curved deflectors N.

In setting up the mill for operation the shell and cone are adjusted to the position desired, so as to bring rotary grinder J in proper position with relation to shell E, and then the outer grinding surface or wall L is adjusted by means of the set-screws L', so as to afford the desired space between it and the outer surface of the rotary grinder, and by this means the mill may be caused to grind coarse or fine, as is desired.

The rotary grinding-cone is provided with a central depending bearing which is supported in the upper end of the fixed shell and which may be operated by any of the well-known means for securing the desired adjustment of the grinder.

Openings O are formed in the rotary shell over grinder J, through which the grain may pass outward from the grinder to the space between the grinder's outer surface and wall L. Deflectors N serve to throw the grain outward and cause it to drop in said space. These openings O are adapted to be partially covered by slides P, which control the flow of grain therethrough.

In operation the crushed grain drops downward in the space between the shell and cone, as indicated by the arrows in Fig. 1, a portion falling between the inner surface of grinder J and cone B, while a portion thereof follows the direction of the arrows through openings O and outward over said grinder J, being assisted in its outward movement by the curved deflectors N, so as to drop down in the outer grinding-space between grinder J and wall L. The grinding-mill of simple construction and of double grinding capacity is thus provided.

Having thus fully described my invention, what I claim, and desire to secure by Letters Patent, is—

1. In a grinding-mill, the combination of the inner cone-shaped grinder, a rotatable shell, a grinder movable therewith and depending adjacent to the cone-shaped grinder, and the vertically-adjustable grinding-wall arranged adjacent to and inclosing the movable grinder, substantially as shown and described.

2. In a grinding-mill, the combination of the grinding-cone, the rotatable shell, the depending grinder carried thereby and adapted to rotate adjacent to the grinding-cone, the shell being provided with outlets over the movable grinder, whereby the grain is adapted to feed outward from the shell and over said grinder, the stationary outer grinding-wall, the surrounding ring projected inward from its upper end, and the deflectors depending from the under side of said ring to throw the grain between the outer surface of the rotary grinder and outer grinding-wall, substantially as shown and described.

3. In a grinding-mill, the combination of the grinding-cone, the rotary shell having openings, dampers for controlling said openings, a grinder depending from the shell beneath said openings and adapted to rotate around the grinding-cone, an outer grinding-wall adjustable vertically whereby the substantially wedge-shaped space between the inner and outer grinding-walls may be contracted or enlarged, the inturned ring at the upper end of the outer grinding-wall, and the curved deflectors depending therefrom and overhanging the rotary grinder for the purpose, substantially as shown and described.

In testimony whereof I affix my signature in presence of two witnesses.

DAVID W. BOVEE.

Witnesses:
W. A. HALLOWELL,
M. F. DERRICK.